Figure 1:
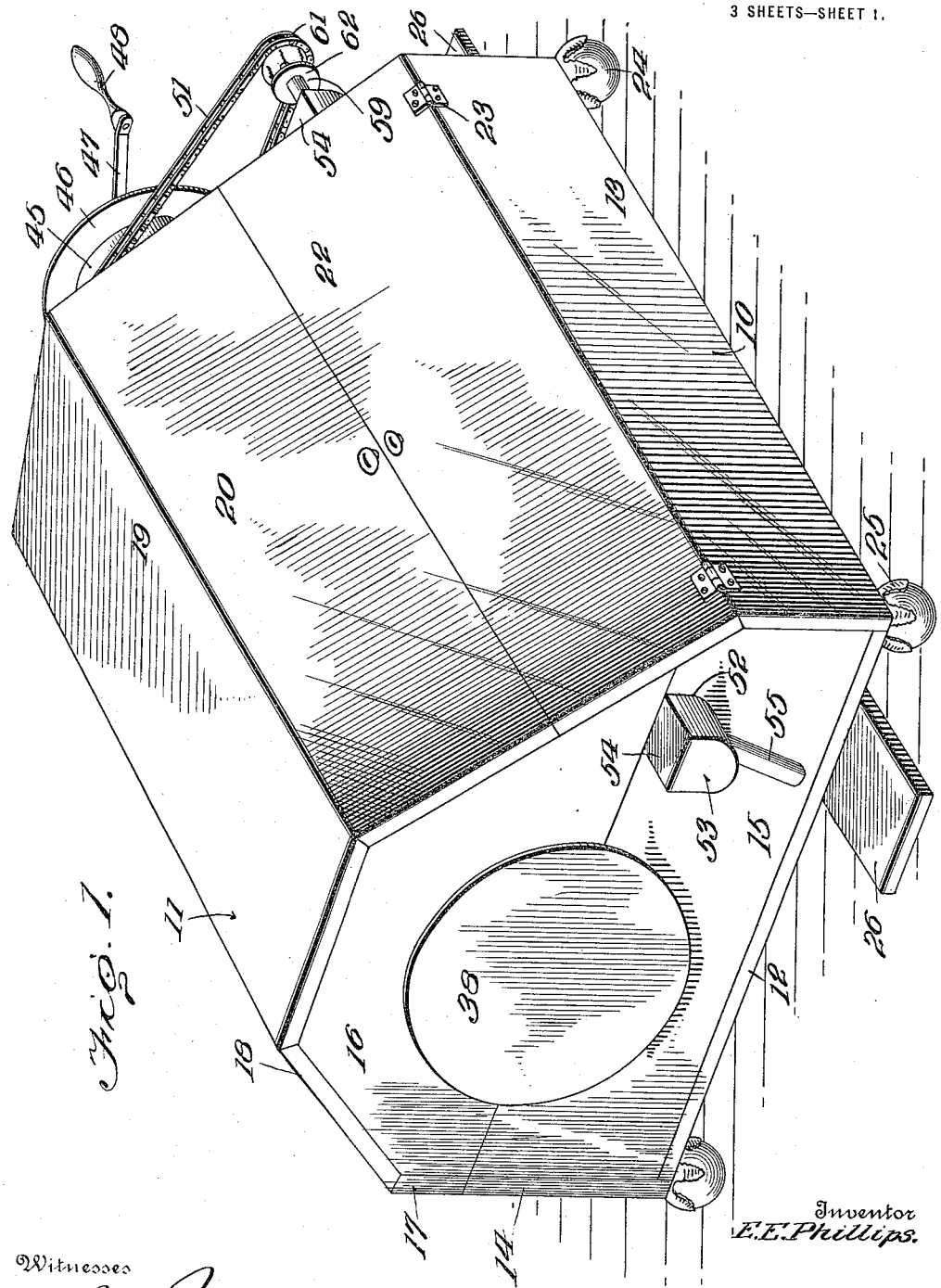

UNITED STATES PATENT OFFICE.

EMRY E. PHILLIPS, OF WEST FRANKFORT, ILLINOIS.

FREEZER.

1,155,680. Specification of Letters Patent. Patented Oct. 5, 1915.

Application filed March 21, 1914. Serial No. 826,353.

*To all whom it may concern:*

Be it known that I, EMRY E. PHILLIPS, citizen of the United States, residing at West Frankfort, in the county of Franklin and State of Illinois, have invented certain new and useful Improvements in Freezers, of which the following is a specification.

My invention relates to new and useful improvements in freezers, the primary object of my invention being the provision of a neat, compact, and readily portable freezer for ice-cream, ices, sherbets, and other like products, in order that the cream, ice, or sherbet may be frozen at the table.

A further object of my invention is to construct a freezer of the above described type arranged in such a manner that, if desired, a cream and an ice may be frozen at the same time.

A still further object of my invention is the provision of a freezer which will be almost instantaneous in its action, and in which the frozen product will, through ordinary manipulation of the freezer proper, be delivered or discharged into dishes or other receptacles suitably placed with respect to the freezer. This discharging apparatus is so arranged that in case a cream and ice are being frozen at the same time, or creams or ices of different flavors are being frozen at the same time, they will be separately delivered into separate dishes.

My invention in its simplest embodiment includes a casing inclosing a receptacle or tray adapted to receive the liquid to be frozen and a drum or rotor mounted to extend peripherally into the tray to receive a film of the liquid to be frozen, the drum being filled with any suitable freezing compound, such as a mixture of salt and ice.

In addition to the above features, the freezer includes a two-part trough arranged to engage by one edge against the periphery of the drum and a conveyer mechanism mounted in the trough and operated by rotating the drum to carry the frozen product straight from the drum by its engagement with the trough to opposite ends of the trough from which discharge spouts extend, these spouts being, of course, located exteriorly of the casing.

In designing the above described freezer, a still further object of my invention is to construct the drum containing the freezing mixture, and serving as the active element of the freezer, in such a manner that it may be utilized in connection with a tray having a transverse partition wall, a portion of the peripheral face of the drum extending within one of the tray divisions thus formed, and a second portion extending within the other of the tray divisions, this arrangement permitting the freezing of two different creams or ices at the same time, if desired.

Still another object of my invention is to provide oppositely operating conveyers in the trough in order that the different products scraped from the different parts of the cylinders may be carried in opposite directions and separately discharged from the freezer.

A still further object of my invention is to so construct the tray that a portion of the drum periphery will be submerged in the liquid contained in the tray as long as any liquid remains therein.

Another object of my invention consists in the construction of the casing in such a manner that the freezing drum may be readily removed from the casing in order to initially fill it with the freezing mixture, and to permit subsequent emptying of the freezing mixture and cleaning of the drum.

A still further object of my present invention is the construction of the conveyer mechanism in two parts so arranged that it may be readily disconnected from its driving mechanism and removed from the trough for the purpose of cleaning.

With these and other objects in view, my invention will be more fully described, illustrated in the accompanying drawings, and then specifically pointed out in the claims, which are attached hereto and form a part of this application.

Figure 2:
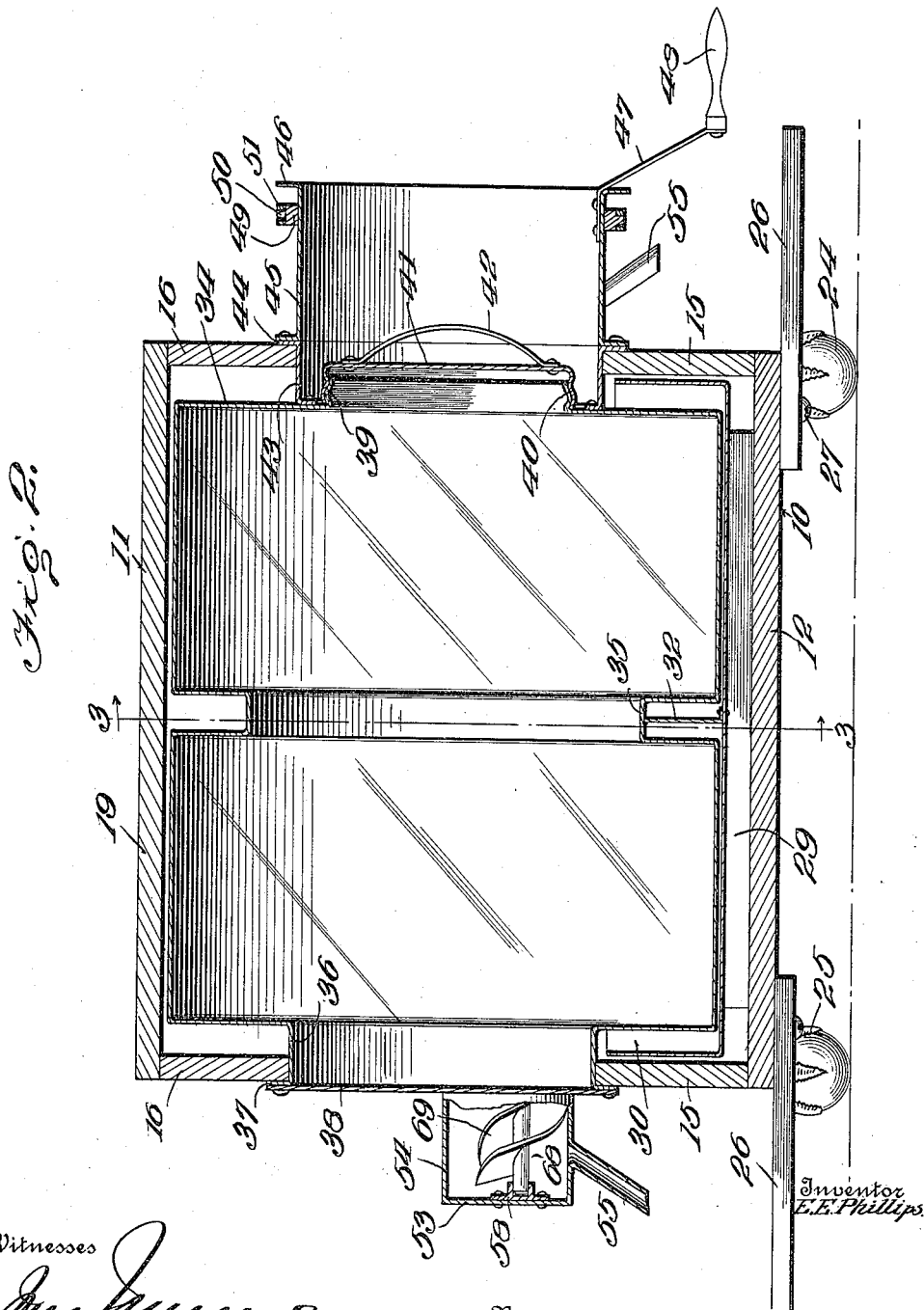
Figure 3:
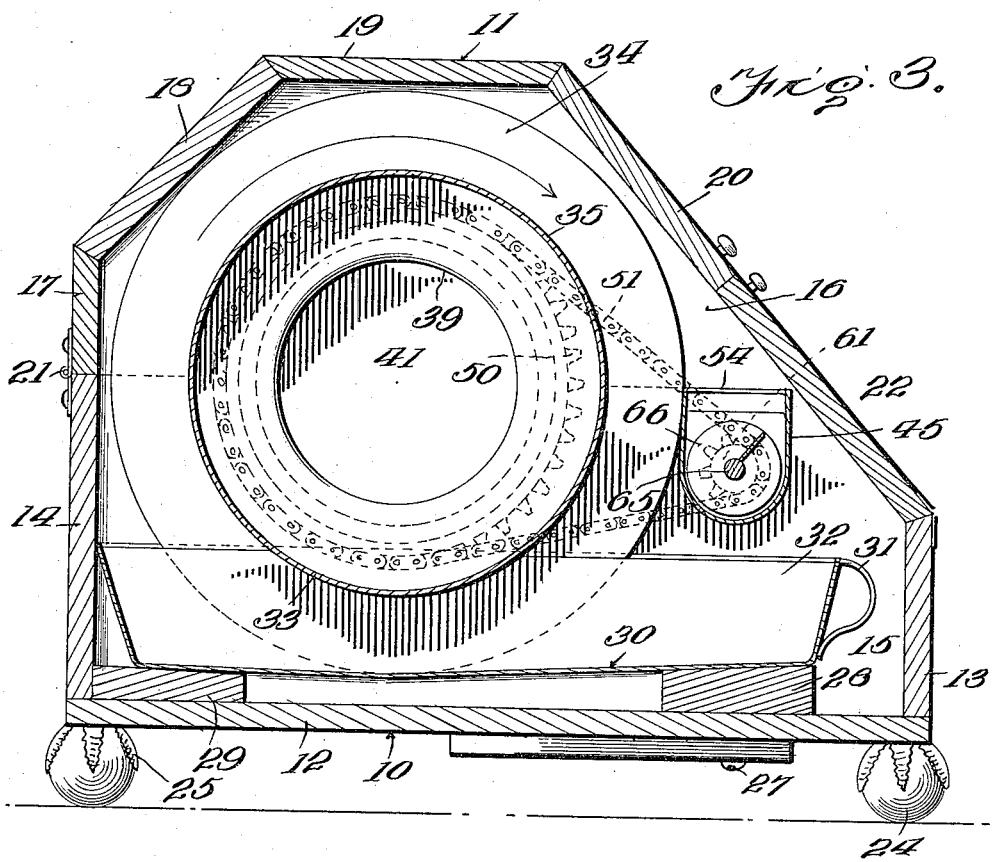
Figure 4:
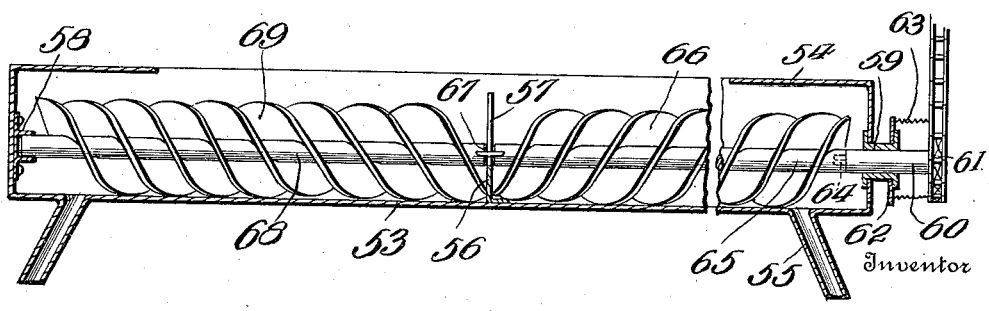

In the drawings, Figure 1 is a perspective view of my improved freezer in assembled position; Fig. 2 is a longitudinal vertical sectional view taken through the axis of the drum; Fig. 3 is a transverse sectional view taken on the line 3—3 of Fig. 2; and Fig. 4 is a fragmentary longitudinal section of the conveyer.

As disclosed in the drawings, which illustrate the preferred form of my invention, the freezer proper is inclosed in a casing including a lower section 10, and upper section 11, the lower section having a bottom 12, front wall 13, rear wall 14, and end walls 15, and being preferably rectangular in shape. The upper section, which in effect forms the cover, includes end wall portions 16 of irregular shape to receive what in fact constitute top sections 17, 18, 19 and 20, the end wall sections 16 being so shaped that the above described top wall conforms to the curvature of the freezing drum, as will be later explained. The top wall section 17 is hingedly connected to the rear wall 14 of the casing by hinges 21, and the lower or forward edge of the top wall section 20 terminates a slight distance above the front wall section 13 of the casing, the space between these walls being normally closed by an auxiliary top or closure 22 mounted by hinges 23 carried by the front wall 13. By this arrangement, the closure 22 may be independently opened to permit access to a part of the casing, for a reason to be later explained, or after such closure 22 has been opened the remaining top section may be swung rearwardly to completely expose the interior of the casing.

Preferably the casing is provided at its corners with supporting feet 24 of any suitable type, those shown constituting glass balls mounted in claw-shaped holders 25 carried by the bottom 12 of the casing. Extending from the ends of the casing adjacent its forward side, and secured to the bottom 12 thereof, are supporting shelves or brackets 26, the purpose of which will be later explained. These shelves are preferably secured by a single screw 27 in such a manner that, when the freezer is not in use, they may be swung beneath the casing, and, therefore, out of the way.

Extending longitudinally within the casing and along the bottom thereof adjacent the front and rear walls are supporting strips 28 and 29 adapted to receive the liquid holding tray, indicated as a whole by the numeral 30, and hold the same in spaced relation to the bottom of the casing. This tray or receptacle is formed of sheet metal, preferably aluminum, tin, or some other non-corroding metal, and is provided with a handle 31 by means of which it may be readily removed from the casing for cleaning. As clearly shown in Fig. 3 of the drawings, the bottom of the tray is inclined downwardly from the front and rear walls toward the middle in such a manner that any liquid contained in the tray will naturally seek the longitudinal central portion of the tray. The tray is provided centrally with an upstanding partition wall 32 extending from its front to its rear walls, and thereby providing two separate and distinct compartments adapted to receive, if desired, two separate liquids to be frozen, the upper edge of this partition wall being cut-away arcuately, as best shown at 33 in Fig. 3 of the drawings.

The so-called freezing drum, indicated as an entirety by the numeral 34 is constructed in cylindrical form of sheet metal, such as tin or aluminum, preferably of the same kind of metal as the tray, and is provided centrally of its length with a circumferentially formed, relatively deep depression or bead 35 by means of which its peripheral face is divided into two portions. This bead is of such depth that, when the drum is positioned in the casing, the partition wall 32 will seat in the bead, the inner face of the bead bearing upon the cut-away arcuate edge portion 33 of such wall, while the main peripheral face of the drum will project into the compartments of the tray in such manner as to barely clear the bottom of the tray at its deepest point. Because of this arrangement, it will be clear that as long as any liquid remains in either or both compartments of the tray, some portion of the freezing drum will project into the liquid. The freezing drum 34 at one end is provided with an outwardly directed, concentrically formed flange or neck 36, terminating in a laterally directed extension 37, and this neck is closed by a plate 38 which is preferably both riveted and soldered to the extension 37 of the flange 36 in order to form an absolutely fluid tight closure. The opposite end of the drum is provided with a concentrically formed, oppositely directed annular flange 39 pressed to provide screw-threads for engagement with the screw-threaded flange 40 of a closure cap 41 having a bail handle 42 by means of which it may be readily turned to apply it to the drum or remove it therefrom. It will, of course, be apparent that any suitable freezing mixture such as ice and salt may be packed in the drum through the opening normally closed by the cap 41, and that, when the said cap is tightly threaded in place any leakage from the drum will be prevented.

An annular bearing ring 43 is secured about the flange 39, being spaced therefrom a sufficient distance not to interfere with the positioning of the cap 41, and the free edge of this flange is provided with a lateral extension 44. In effect the flange 43 and its extension 44 correspond to the flange 36 and extension 37 at the opposite end of the drum. The end wall sections 15 and 16 have their abutting edges cut-away to form, when the casing is closed, circular apertures, providing bearings for the freezing drum, the bearing flanges 36 and 43 engaging in these apertures, while their extensions 37 and 44 bear against the outer face of the end walls to prevent any longitudinal movement of the drum. If deemed advisable, the bearing faces of the openings thus formed in the end walls may be lined with metal or other material to prevent undue wear.

In order to render filling of the freezing drum with its freezing mixture more simple, and for other purpose, which will be later apparent, I provide a spout 45 having at each end a laterally directed extension or flange 46, one of these flanges being riveted, soldered or otherwise secured to the extension 44 of the bearing flange 43 in such a manner that the spout member 45 in effect forms a continuation of this flange. Rotary movement may be imparted to the drum by means of a hand crank 47 which is secured by one end to the inner face of the spout 45, and which carries at its opposite end a handle 48. An annular ring 49 surrounds the spout 45, being secured against independent turning movement thereon, and is provided with a plurality of teeth 50 adapted to engage a sprocket chain 51 which, as will be later explained, serves as a means for transmitting power from the rotating freezing drum to the conveyer mechanisms.

As best shown in Fig. 1 of the drawings, the end wall sections 15 in advance of the freezing drum are cut-away at their upper edges, as at 52, to provide seats to detachably receive the end portions of a conveyer trough 53 which is also formed of sheet metal, being substantially U-shaped in cross section and open at its top except at the ends which extend beyond the walls of the casing, these ends being closed, as shown at 54. Discharge spouts 55 lead downwardly and outwardly from the end portions of the trough in order to discharge any frozen food product carried along the trough in either direction. It will be noted that the supporting shelves 26 will be located immediately below these spouts in such a position that dishes mounted thereon will be positioned to receive the frozen products as they pass through the spouts. The upper edge of one of the side walls of the conveyer 53, as clearly shown in Fig. 3, engages against the peripheral surfaces of the freezing drum 34 in such a manner that any frozen coating or film of the frozen product carried by the drum, assuming that the drum is rotated in the proper direction, that is a clock-wise direction, as shown in Fig. 3, will be scraped from the drum and delivered into the trough.

In order to provide means for conveying the frozen cream or ice received by the trough to the spouts 55, I provide the trough centrally with a transversely extending partition wall 56 having a vertically formed central slot 57 extending from its upper edge to a point substantially midway its height, and that end of the trough remote from the crank carrying end of the drum with a centrally formed socket bearing 58 in horizontal alinement with the lower end of the slot 57. The opposite end of the trough is provided with an opening in which fits one end of a sleeve 59 provided with peripheral terminal flanges, this sleeve being preferably secured in the end wall to prevent any longitudinal or turning movement. A shaft 60 is journaled for rotation in this sleeve and carries at its outer end a sprocket wheel 61 about which the sprocket chain 51, previously described, is trained. A collar 62 fits loosely about the sleeve 59, and a plurality of helical springs 63 connect the sprocket wheel 61 with the collar 62, there being a tendency at all times to draw the shaft 60 toward the adjacent end of the trough. One end of the shaft 60 extends a slight distance within the trough and is reduced and squared, as shown at 54, to fit in a correspondingly formed socket in one end of a helical screw-conveyer shaft 65 having a helical conveying blade 66 extending throughout practically its entire length. The opposite end of this shaft terminates at the partition wall 56 and is swingingly coupled as shown at 67 to the adjacent end of a similar conveyer shaft 68 having a helical conveying blade 69, the other end of this latter shaft being journaled in the bearing 58.

From the foregoing description, it will be apparent that rotation of the sprocket wheel 61 will simultaneously rotate both conveyer shafts 65 and 68 in the same direction. It will be further apparent that by drawing the shaft 60 outwardly against the action of the springs 63 its extension 64 may be freed from the shaft section 65 when both the shaft sections 65 and 68 may be removed from the trough by grasping their coupled ends to lift them upwardly, the swinging action permitting the free ends of the shafts to move toward each other as they are raised, and, therefore, withdraw from the closed end portions 54 of the trough.

In operation, the closure 22 is opened, and the remaining top section of the casing swung back to permit removal of the freezing drum 34. This drum is opened by removal of the cap 41, and closely packed with a freezing mixture of any ordinary nature, salt and ice being preferably employed, when the cap is replaced and the freezing drum again placed in the casing, after which the top section of the casing is closed, the closure 22, however, remaining open. If then, one kind of cream, ice or sherbet is to be frozen, it is poured into one compartment of the tray, or, if rapidity of freezing is desired, into both compartments. On the other hand, if two different kinds of creams or ices are to be frozen at once, one side of the tray is filled with one kind of cream or ice, and the other side of the tray is filled with another kind of cream or ice. As will be clearly seen from an inspection of Fig. 3, the liquid may be readily poured into the tray when the closure 22 is opened. After thus placing the liquid in the freezer, the closure 22 is shut, and the freezer is ready for use. The dishes or other suitable receptacles adapted to receive the frozen product or products as they pass from the freezer are then placed upon the shelves 26 beneath the discharge spouts of the conveyers, and the crank 48 manipulated to rotate the freezing drum in the direction shown by the arrow in Fig. 3, this rotation of the drum being relatively slow. As the drum rotates, a portion of its peripheral face being always submerged into the liquid to be frozen, the said product by necessity forms a thin coating or film over the periphery of the drum which, because of its extreme thinness, is almost instantaneously frozen and is in effect scraped off as frozen cream or ice by that edge of the conveyer trough engaging against the peripheral surface of the drum.

At this point it should be noted that the conveyer blades 66 and 69 are reversely formed, for which reason the frozen products that are collected in the trough will be conveyed to their respective ends of the trough and discharged into the separate receptacles, the frozen product of the liquid contained in one side of the tray being discharged into one receptacle, while that contained in the other side of the tray is discharged into the receptacle at the other end.

I intend primarily that the above described freezer shall be used at the table for producing frozen creams, ices and the like in much the same manner as chafing dishes are employed for the preparation of hot products. One of the primary advantages of my improved freezer is the fact that the cream or ice may be frozen only as desired, and that the frozen product is delivered directly into individual dishes, handling of the frozen product with spoons or other utensils being unnecessary. The freezing of food products by the utilization of my ice-cream freezer is so nearly instantaneous that a freezer of convenient size for use upon the table is capable of freezing approximately a pint of liquid per minute.

Although I have illustrated and described my improved freezer in all its details of construction, it will, of course, be understood that I do not limit myself to the specific details disclosed, as various minor changes, within the scope of the appended claims, may be made at any time without in the slightest degree departing from the spirit of my invention.

What I claim is:

1. An ice-cream freezer comprising a casing, a tray mounted therein, a partition in the tray, a drum rotatably mounted in the casing and extending peripherally into the tray and provided with a peripheral bead receiving the partition, means for rotating the drum, a trough mounted in the casing with one edge in contact with the drum, a partition in the trough, covers for the ends of the trough, conveyers mounted in the trough between the ends of the same and the partition therein, one of said conveyers having one end of its shaft journaled upon the end of the trough, a coupling between the inner ends of the conveyer and supported by the partition, said coupling permitting swinging movement of the conveyer shafts relative to each other whereby they may be withdrawn from under the covers at the ends of the trough, a shaft mounted in one end of the trough, a gear on the outer end of said shaft, means acting on said gear to rotate the shaft, a collar mounted upon the end of the trough, and springs connecting said collar with said gear whereby to hold the said shaft in operative engagement with the adjacent end of the adjacent conveyer shaft.

2. An ice-cream freezer comprising a casing, a tray mounted therein, a drum provided at one end with an axially extending annular flange projecting through the end of the casing to form a journal for the drum and extended laterally at its outer end to bear against the outer face of the casing, a bearing ring secured to the opposite end of the drum and having a lateral extension, a spout secured to the lateral extension, a handle carried by said spout, and a closure for the drum housed within said bearing ring and detachably secured to a flange surrounding an opening in the end of the drum.

3. An ice cream freezer including a casing, a liquid holding tray mounted in the casing and divided into two compartments by a transverse partition, a freezing mixture holding drum rotatably mounted in the casing and provided intermediate its length with a circumferential depression receiving the partition whereby the resulting peripheral faces of the drum extend into the compartments of the tray, a trough bearing by one edge against the peripheral faces of the drum, oppositely acting conveyers mounted in the end portions of the trough, means for rotating the drum, and means actuated by the drum rotating means for simultaneously actuating the conveyers.

In testimony whereof I affix my signature in presence of two witnesses.

EMRY E. PHILLIPS. [L. S.]

Witnesses:
JOHN GARDINER,
H. N. HARMON.